(12) United States Patent
Alkeskjold et al.

(10) Patent No.: US 10,228,510 B2
(45) Date of Patent: Mar. 12, 2019

(54) PHOTONIC CRYSTAL FIBER, A METHOD OF PRODUCTION THEREOF AND A SUPERCONTINUUM LIGHT SOURCE

(71) Applicant: NKT PHOTONICS A/S, Birkerød (DK)

(72) Inventors: Thomas Tanggaard Alkeskjold, Jyllinge (DK); Casper Laur Byg, Kvistgård (DK); Christian Jakobsen, Virum (DK); Jens Kristian Lyngsøe, Hornbæk (DK); Kim G. Jespersen, Lyngby (DK); Jeppe Johansen, København Ø (DK); Martin Dybendal Maack, Kongens Lyngby (DK); Martin Erland Vestergaard Pedersen, Allerød (DK); Carsten L. Thomsen, Virum (DK)

(73) Assignee: NKT PHOTONICS A/S, Birkerød (DK)

( * ) Notice: Subject to any disclaimer, the term of this patent is extended or adjusted under 35 U.S.C. 154(b) by 0 days.

(21) Appl. No.: 15/537,005

(22) PCT Filed: Dec. 15, 2015

(86) PCT No.: PCT/DK2015/050395
§ 371 (c)(1),
(2) Date: Jun. 16, 2017

(87) PCT Pub. No.: WO2016/095923
PCT Pub. Date: Jun. 23, 2016

(65) Prior Publication Data
US 2017/0351023 A1    Dec. 7, 2017

(30) Foreign Application Priority Data

Dec. 18, 2014    (DK) .................................. 2014 70800

(51) Int. Cl.
*G02B 6/36* (2006.01)
*C03C 13/04* (2006.01)
(Continued)

(52) U.S. Cl.
CPC ...... *G02B 6/03694* (2013.01); *C03B 37/0279* (2013.01); *C03B 37/02781* (2013.01);
(Continued)

(58) Field of Classification Search
CPC ............ G02B 6/03694; G02B 6/02357; G02B 6/02361; G02B 6/02395; C03C 25/1062;
(Continued)

(56) References Cited

U.S. PATENT DOCUMENTS

| | | | |
|---|---|---|---|
| 4,606,608 A | 8/1986 | Wysocki | |
| 5,000,541 A | 3/1991 | DiMarcello et al. | |

(Continued)

FOREIGN PATENT DOCUMENTS

| | | |
|---|---|---|
| CA | 2579828 A1 | 8/2008 |
| EP | 0 498 939 A1 | 8/1992 |

(Continued)

OTHER PUBLICATIONS

Chen et al., "Photonic Crystal Fiber with W-Type Effective Refractive Refractive Index Profile," Optik—International Journal for Light and Electron Optics, (Aug. 2013), vol. 124, Issue 16, pp. 2309-2312.

(Continued)

*Primary Examiner* — Ryan Lepisto
*Assistant Examiner* — Erin Chiem
(74) *Attorney, Agent, or Firm* — Buchanan Ingersoll & Rooney P.C.

(57) ABSTRACT

The invention concerns a Photonic Crystal Fiber (PCF) a method of its production and a supercontinuum light source comprising such PCF. The PCF has a longitudinal axis and (Continued)

comprises a core extending along the length of said longitudinal axis and a cladding region surrounding the core. At least the cladding region comprises a plurality of microstructures in the form of inclusions extending along the longitudinal axis of the PCF in at least a microstructured length section. In at least a degradation resistant length section of the microstructured length section the PCF comprises hydrogen and/or deuterium. In at least the degradation resistant length section the PCF further comprises a main coating surrounding the cladding region, which main coating is hermetic for the hydrogen and/or deuterium at a temperature below Th, wherein Th is at least about 50° C., preferably 50° C.<Th<250° C.

51 Claims, 7 Drawing Sheets

(51) Int. Cl.

| | | |
|---|---|---|
| *G02B 6/14* | (2006.01) | |
| *G02B 6/02* | (2006.01) | |
| *C03C 25/60* | (2018.01) | |
| *G02F 1/365* | (2006.01) | |
| *G02F 1/35* | (2006.01) | |
| *G02B 6/036* | (2006.01) | |
| *C03C 25/106* | (2018.01) | |
| *C03C 25/1065* | (2018.01) | |
| *C03B 37/027* | (2006.01) | |
| *C03B 37/10* | (2006.01) | |
| *C03C 25/607* | (2018.01) | |

(52) U.S. Cl.
CPC ............ *C03B 37/10* (2013.01); *C03C 13/045* (2013.01); *C03C 13/046* (2013.01); *C03C 25/1061* (2018.01); *C03C 25/1062* (2018.01); *C03C 25/1068* (2018.01); *C03C 25/607* (2013.01); *G02B 6/02347* (2013.01); *G02B 6/02357* (2013.01); *G02B 6/02361* (2013.01); *G02B 6/02395* (2013.01); *G02B 6/14* (2013.01); *G02F 1/365* (2013.01); *C03B 2201/02* (2013.01); *C03B 2201/12* (2013.01); *C03B 2201/21* (2013.01); *C03B 2201/22* (2013.01); *C03B 2203/14* (2013.01); *C03B 2203/23* (2013.01); *C03B 2203/42* (2013.01); *C03C 2201/02* (2013.01); *C03C 2201/21* (2013.01); *C03C 2201/22* (2013.01); *G02B 6/02366* (2013.01); *G02F 2001/3528* (2013.01)

(58) Field of Classification Search
CPC . C03C 25/1068; C03C 25/607; C03C 13/046; C03C 2201/02; C03B 37/0279; C03B 2201/22; C03B 2201/21; C03B 2203/42; G02F 1/365; G02F 2001/3528
See application file for complete search history.

(56) References Cited

U.S. PATENT DOCUMENTS

| | | | |
|---|---|---|---|
| 5,235,659 | A | 8/1993 | Atkins et al. |
| 5,256,177 | A | 10/1993 | Bennett et al. |
| 5,267,343 | A | 11/1993 | Lyons et al. |
| 5,621,843 | A | 4/1997 | Neuberger |
| 5,802,236 | A | 9/1998 | DiGiovanni et al. |
| 5,983,673 | A | 11/1999 | Urano et al. |
| 6,220,059 | B1 | 4/2001 | Klein et al. |
| 6,311,524 | B1 | 11/2001 | Brennan et al. |
| 6,564,585 | B2 | 5/2003 | Abe et al. |
| 6,661,957 | B1 | 12/2003 | Levenson et al. |
| 6,763,686 | B2 | 7/2004 | Carpenter et al. |
| 6,944,380 | B1 | 9/2005 | Hideo et al. |
| 7,493,009 | B2 | 1/2009 | Homa |
| 8,145,023 | B2 * | 3/2012 | Thomsen ................ G02F 1/365 |
| | | | 264/1.24 |
| 8,406,594 | B2 | 3/2013 | Alkeskjold |
| 8,600,207 | B2 | 12/2013 | Broeng et al. |
| 9,291,770 | B2 * | 3/2016 | Robin ................ G02B 6/02295 |
| 9,766,530 | B2 * | 9/2017 | Thomsen ................ G02F 1/365 |
| 2003/0215201 | A1 | 11/2003 | Tanigawa et al. |
| 2004/0057682 | A1 | 3/2004 | Nicholson et al. |
| 2005/0031867 | A1 | 2/2005 | Majid et al. |
| 2005/0226576 | A1 | 10/2005 | Feder et al. |
| 2006/0013546 | A1 | 1/2006 | Kurusu et al. |
| 2006/0188206 | A1 | 8/2006 | Majid et al. |
| 2009/0022189 | A1 | 1/2009 | Okuno |
| 2010/0040335 | A1 | 2/2010 | Thomsen |
| 2010/0266251 | A1 | 10/2010 | Lyngsoe |
| 2011/0116283 | A1 | 5/2011 | Thomen et al. |
| 2012/0195554 | A1 | 8/2012 | Maack |
| 2016/0156148 | A1 | 6/2016 | Thomsen et al. |
| 2016/0170136 | A1 | 6/2016 | Johansen et al. |
| 2017/0085051 | A1 | 3/2017 | Thomsen et al. |

FOREIGN PATENT DOCUMENTS

| | | |
|---|---|---|
| EP | 0780707 | 6/1997 |
| EP | 0 810 453 A1 | 12/1997 |
| EP | 0 943 936 | 9/1999 |
| EP | 1 020 413 | 7/2000 |
| EP | 1 426 795 | 6/2004 |
| EP | 2 770 370 A2 | 8/2014 |
| EP | 2821379 A1 | 1/2015 |
| GB | 2425307 | 10/2006 |
| JP | S 60090852 | 5/1985 |
| JP | H 04059630 | 6/1990 |
| JP | 2000-103629 | 4/2000 |
| JP | 2000-137257 | 5/2000 |
| JP | 2002-214454 | 7/2002 |
| JP | 2004-345919 | 12/2004 |
| JP | 2004-361526 | 12/2004 |
| WO | WO 98/57203 | 12/1998 |
| WO | WO 00/37974 | 6/2000 |
| WO | WO 02/06868 | 1/2002 |
| WO | WO 03/016967 | 2/2003 |
| WO | WO 03/078338 | 9/2003 |
| WO | WO 2004/095096 | 11/2004 |
| WO | WO 2005/010583 A1 | 2/2005 |
| WO | WO 2005/054144 | 6/2005 |
| WO | WO 2006/021569 | 3/2006 |
| WO | WO 2008/003138 | 1/2008 |
| WO | WO 2008/083686 | 7/2008 |
| WO | WO 2015/003714 A1 | 1/2015 |
| WO | WO 2015/003715 A1 | 1/2015 |
| WO | WO 2015/144181 A1 | 10/2015 |

OTHER PUBLICATIONS

Search Report dated Jun. 24, 2015, by the Danish Patent and Trademark Office in corresponding Danish Patent Application No. PA 2014 70800. (9 pages).
Lyngsøe et al., U.S. Appl. No. 15/128,697, entitled "Microstructured Fiber and Supercontinuum Light Source" filed Sep. 23, 2016.
International Search Report (PCT/ISA/210) dated Mar. 4, 2016, by the Nordic Patent Institute as the International Searching Authority for International Application No. PCT/DK2015/050395.
Written Opinion (PCT/ISA/237) dated Mar. 4, 2016, by the Nordic Patent Institute as the International Searching Authority for International Application No. PCT/DK2015/050395.
Nicholson, J.W. et al., "Spatially and spectrally resolved imaging of modal content in large mode-area fibers", Optics Express, vol. 16, No. 10, pp. 7233-7243, May 12, 2008.
Extended Search Report dated Jul. 9, 2018, by the European Patent and Trademark Office in corresponding European Patent Application No. 15869379.6 (11 pages).
Partial European Search Report dated Mar. 31, 2011, issued in the corresponding European Application No. 11 15 3488.

(56) References Cited

OTHER PUBLICATIONS

Office Action (Notification of Reasons for Rejection) dated Jan. 5, 2016, by the Japanese Patent Office in Japanese Patent Application No. 2015-052013, and an English Translation of the Office Action. (11 pages).
Ex parte Quayle issued on Feb. 14, 2017, by the U.S. Patent and Trademark Office in the copending U.S. Appl. No. 14/956,578. (15 pages).
The Extended European Search Report dated Mar. 29, 2012, by the European Patent Office in corresponding European Patent Application No. 11153488.9-2217. (23 pages).
Office Action (Communication pursuant to Article 94(3) EPC) dated Apr. 11, 2016, by the European Patent Office in European Patent Application No. 08 700 884.3-1903. 7 pages.
Extended European Search Report (Communication) dated Jun. 28, 2018, issued by the European Patent Office in corresponding European Application No. 18168233.7-1209 (9 pages).
Office Action (Notification of Reasons for Rejection) dated Jan. 9, 2018, by the Japanese Patent Office in Japanese Patent Application No. 2016-238365, and an English Translation of the Office Action. (8 pages).
International Search Report (Form PCT/ISA/210) and Written Opinion of the International Searching Authority (Form PCT/ISA/237), dated Sep. 29, 2010, issued by the European Patent Office in corresponding International Patent Application No. PCT/DK2009/050158.
Office Action dated Sep. 26, 2011, by the U.S. Patent and Trademark Office in U.S. Appl. No. 12/522,758. (9 pages).
Notice of Allowance dated Jan. 17, 2012, by the U.S. Patent and Trademark Office in the related U.S. Appl. No. 12/522,758. (8 pages).
Office Action (Communication pursuant to Article 94(3) EPC) dated Mar. 7, 2017, by the European Patent Office in corresponding European Patent Application No. 11 153 488.9-1562. (6 pages).
Bjarklev et al., "Photonic Crystal Fibres", Kluwer Academic Publishers, Chapter 4, 2003, pp. 115-130.
Birks et al., "2D Photonic Band Gap Structures In Fibre Form", Published in Photonic Band Gap Materials (Editor: C. M. Soukoulis) Kluwer, 1996, p. 1-8.
Farrow, et al. "Design of refractive-index and rare-earth-dopant distributions for large-more-area fibers used in coiled high-power amplifiers," Proceedings of the SPIE, vol. 6453, 2007, pp. 64531 C-1-64531 C-11.
Fu et al. "Fibre Bragg Gratings Written in Pure Silica Photonic Crystal Fibres with Ultraviolet Femtosecond Laser Pulse" 30th Australian conference on Optical Fibre Technology 2005, Jul. 4, 2005. (3 pages).
Fu et al. "Femtosecond laser writing Bragg gratings in pure silica photonic crystal fibres" Electronics Letters, IEE Stevenage, GB, vol. 41, No. 11, May 26, 2005, pp. 638-640.
Genty, et al. "Generation of Wide Supercontinuum in a Weakly Nonlinear Microstructured Fiber," Conference on Lasers and Electro-Optics 2006, Long Beach, CA, May 2006, pp. 1-2.
D. Griscom, "Optical Properties and Structure of Defects in Silica Glass", Journal of the Ceramic Society of Japan, 1991, pp. 923-942, vol. 99, No. 10.
Karlitschek, P. et al. "Influence of hydrogen on the colour center formation in optical fibers induced by pulsed UV-Laser radiation. Part 1: all silica fibers with high-OH undoped core," Optics Communications, vol. 155, No. 4-6, Oct. 15, 1998, pp. 376-385.

Knight et al., "All-Silica Single-Mode Optical Fiber with Photonic Crystal Cladding", Optics Letter, (1996), vol. 21, No. 19, pp. 1547-1549.
Kirch Hof et al., "High-Power Stability of Optical Fibers for the Visible Wavelength Region", Proceedings of SPIE, 2001), vol. 4579, pp. 322-333, XP-002630791.
Kudlinski, A., et al. "Zero-dispersion wavelength decreasing photonic crystal fibers for ultraviolet-extended, supercontinuum generation," Optics Express, vol. 14, No. 12, Jun. 12, 2006, pp. 5715-5722.
Leproux, et al. "Methods for visible supercontinuum generation in doped/undoped holey fibres," Proceedings of the SPIE, vol. 6990, May 2008, pp. 699007-1-69907-4.
Li et al., "Electron Paramagnetic Resonance Hyperfine Spectrum of the Si E' Defect Associated with Weakly Bonded Hydrogen Molecules in Synthetic Silica Optical Fibers", Appl. Phys. Lett., (1995), vol. 66, No. 21, pp. 2816-2818.
Li et al., "Interaction of Supercontinuum and Raman Solitons with Microstructure Fiber Gratings" Optics Express, 2005, vol. 13, No. 3, pp. 998-1007, XP-002474853.
F. Lu et al. "Generation of a broadband continuum with high spectral coherence in tapered single-mode optical fibers", Optics Express, Jan. 26, 2004, pp. 347-353, vol. 12, No. 2, Optical Society of America.
Nagasawa et al., "Improvement of Radiation Resistance of Pure Silica Core Fibers by Hydrogen Treatment", Japanese Journal of Applied Physics, (1985), vol. 24, No. 9, pp. 1224-1228, XP-002630792.
Stone et al., "Visibly "while" light generation in uniform photonic crystal fiber using a microchip laser," Optics Express vol. 16, No. 4, Feb. 18, 2008, pp. 2670-2675.
Tomashuk et al., "γ-Radiation-Induced Absorption in Pure-Silica-Core Fibers in the Visible Spectral Region: the Effect of H2-Loading" IEEE Transactions on Nuclear Science, (1998), vol. 45, No. 3, pp. 1576-1579.
Tomashuk et al., "Radiation-Induced Absorption and Luminescence in Specially Hardened Large-Core Silica Optical Fibers" IEEE Transactions on Nuclear Science, (2000), vol. 27, No.3, pp. 693-698, XP-002630793.
Tomashuk et al., "Radiation-Resistant and Radiation-Sensitive Silica Optical Fibers" Proceedings of SPIE, (2000), vol. 4083, pp. 188-201, XP-002630794.
Travers, J. C., et al., "High brightness polychromatic visible generation in photonic crystal fibers with picoseoond Yb pumping," Lasers and Eleotro-Optios, 2005, (CLEO), Conference on Baltimore, MD, USA, vol. 2, May 22, 2005-May J7, 2005, pp. 1229-1230.
Unger, et al., "Transmission Behavior of Silica Core-Fluorine Doped Cladding Fibers in the Visible and Ultraviolet Region," Proceedings of the SPIE, vol. 4616, 2002, pp. 161-172.
R. Watt et al. "Generation of supercontinuum radiation in conventional single-mode fibre and its application to broadband absorption spectroscopy", Applied Physics B, 2008, pp. 47-53, vol. 90.
Xiong, C., et al. "Visible continuum generation from a microchip 1062 nm laser source," Conference on Lasers and 2006 Electro-Optics and 2006 Quantum Electronics and Laser Science Conference, CLEO/QELS 2006, May 21, 2006, pp. 1-2.
M. Yuen, "Ultraviolet absorption studies of germanium silicate glasses", Applied Optics, Jan. 1, 1982, pp. 136-140, vol. 21, No. 1, Optical Society of America.
Singapore Official Action dated Jun. 19, 2018, by the Intellectual Property Office of Singapore in corresponding Singapore Patent Application No. 11201704974T (10 pages).

* cited by examiner

PHOTONIC CRYSTAL FIBER, A METHOD OF PRODUCTION THEREOF AND A SUPERCONTINUUM LIGHT SOURCE

TECHNICAL FIELD

The invention relates to a photonic crystal fiber (PCF), a method of producing the PCF and a supercontinuum light source comprising such PCF, microstructured optical fiber and to a source of optical supercontinuum radiation.

BACKGROUND ART

Photonic crystal fibers, in the following referred to as PCF or microstructured optical fibers, are fibers having a core surrounded by a cladding region having a plurality of inclusions (sometimes called cladding features or microstructures) arranged in a background material, typically in a regular array. The inclusion may be gas, liquid, or solid inclusion. In principle the inclusions could be void, but in practice the voids will normally comprise some gas molecules Fibers of this types are well known in the art and are for example described in US2012195554, U.S. Pat. No. 8,406,594, US2011116283 and US2012195554

The microstructured fiber may for example be of silica glass. Other materials may be added to the silica glass in order to alter the refractive index thereof or to provide effects, such as amplification of light, sensitivity, etc.

The center-to-center spacing between the cladding inclusions is defined as the pitch ($\Lambda$). The PCFs are usually at least partly characterized by the size of the core and the ratio of the size of the inclusions to their spacing or pitch ($\Lambda$). By tailoring the size and pitch of the cladding inclusions, the zero dispersion wavelength (ZDW) of the fiber may be tailored.

Photonic crystal fibers are in general suitable for use in high power light sources. Guiding of relatively high powers in an optical fiber may have relevance for several commercial applications such as such as guiding of surgical and/or therapeutic light, optical sensing, and materials processing. Among such applications is transport of optical energy and utilizing of non-linear effects in the fiber which are commonly more pronounced with higher optical power inside the fiber. The optical power may be continuous wave (CW), pulsed or a mixture thereof. High optical power inside a fiber may be particularly pronounced with pulsed light where a high peak power may be obtainable even while having a relatively modest average power.

One limitation of the average power/spectral density carried by an optical fiber is the damage threshold of the fiber. In particular where the PCF is applied for supercontinuum generation where high power light is fed to the PCF via a launching end (sometimes called an input end) of the PCF, it has been found that the PCF degrades over time in dependence on the peak power of the fed light. Further it has been found that a fiber section adjacent to or close to the launching end is more exposed to degradation than longer from the launching end.

U.S. Pat. No. 8,145,023 describes a method of alleviating the degradation caused by the high power light fed to the PCF by loading the core material and optionally the cladding material with hydrogen and/or deuterium. This loading was found to result in some increase in the lifetime of the fiber. In US2011116283 the method was further improved by subjecting the PCF to an annealing and/or to a high power irradiation after the hydrogen and/or deuterium loading.

DESCRIPTION OF THE INVENTION

An object of the present invention is to provide a PCF suitable for supercontinuum generation, which PCF is very resistant against degradation.

In an embodiment it is an object to provide a PCF suitable for supercontinuum generation, which PCF has a long life time even when used for supercontinuum generation.

A further object is to provide a supercontinuum light source comprising a PCF with a high resistance against degradation as well as preferred applications of such supercontinuum light source.

These and other objects have been solved by the invention or embodiments thereof as defined in the claims and as described herein below.

It has been found that the invention or embodiments thereof have a number of additional advantages which will be clear to the skilled person from the following description.

Photonic Crystal Fiber (PCF) of the invention has a longitudinal axis and comprises a core extending along the length of the longitudinal axis and a cladding region surrounding the core. At least the cladding region comprises a plurality of microstructures in the form of inclusions extending along the longitudinal axis of the PCF in at least a microstructured length section. The PCF has a degradation resistant length section which may be the entire length of the PCF or merely a length section thereof.

The phrase "degradation resistant length section" is used to indicate that the fiber length section has a very high degradation resistance over time relative to other prior art fiber length sections.

The PCF in at least the degradation resistant length section of said microstructured length section comprises hydrogen and/or deuterium and the PCF in at least the degradation resistant length section further comprises a main coating surrounding the cladding region, which main coating is hermetic for said hydrogen and/or deuterium at a temperature below $T_h$, wherein $T_h$ is at least about 50° C. Advantageously $T_h$ is at least about the maximal expected temperature of the PCF when in use. Thereby a minimum of the hydrogen and/or deuterium is diffused out of the fiber over time and/or during use. Preferably $T_h$ is as follows: 50° C.<Th<250° C. In an embodiment $T_h$ is up to about 150° C.

The term 'hermetic' is herein used to mean that any diffusion of the hydrogen atoms and/or deuterium atoms through the coating which is less than about 1% per day measured e.g. using Raman spectroscopy and at the relevant temperature at atmosphere condition (i.e. the fiber is arranged at 1 bar in air) or by IR spectroscopy by measuring the absorption line of H2 (or D2) at around 1240 nm or around 1870 nm for H2 or around 1715 nm for D2. Preferably the hermetic coating allows a diffusion of less than 0.5%, such as less than about 0.1% per day, such as less than about 0.01% per day.

The term "inclusions" means inclusions in a background material, wherein an inclusion has another refractive index than that of the background material surrounding it. The inclusions may e.g. be gas inclusions, such as of air, nitrogen or any other gas; solid inclusions, such of another glass type than the background material and/or a doped material (index changing materials such as F, Ge, P, B), a vacuum inclusion or any combinations thereof. Advantageously at least some of the inclusions are gas—or vacuum inclusions. It has been found that gas inclusions may act as hydrogen/and or deuterium depots where the inclusions are closed on either side of the degradation resistant length section.

The phrase "radial distance" means distance determined in radial direction from the longitudinal axis.

The term "substantially" should herein be taken to mean that ordinary product variances and tolerances are comprised.

It should be noted that the cladding region may have a homogeneous background material or it may have several regions with respective background materials which differ from each other. The background material is advantageously silica optionally doped In an embodiment the cladding region comprises an inner cladding region and an outer cladding region surrounding the inner cladding region wherein the background material of the inner cladding region differs from the background material of the outer cladding region e.g. as described in U.S. Pat. No. 8,600,207.

In an embodiment the cladding region comprises an inner cladding region and an outer cladding region surrounding the inner cladding region wherein the background material of the inner cladding region has the same refractive index as the background material of the outer cladding region. In this embodiment it is advantageous that the inner cladding region and the outer cladding region have the same background material. The difference between the inner and the outer cladding region is for example a difference of the size, type and/or number of inclusions. The cladding region confines the light to the core, and advantageously the inclusions are arranged to influence the average refractive index which results in the confining of the light. This means that the inclusions should be relatively close to the core, and preferably at least some of the inclusions should have a center-to-center distance to the core of up to about 50 µm, preferably up to about 40 µm, such as up to about 30 µm, such as up to about 15 µm.

When describing the material of cladding region, inclusions and core, the amount of hydrogen and/or deuterium is not included as part of the material.

In an embodiment the background material of the cladding region and the core material is substantially pure silica.

In an embodiment the background material of the cladding region and the core material is silica doped with fluoride.

It has been found that where the core material is doped with fluoride in at least the degradation resistant length section, an even higher resistance against photo induced degradations can be achieved.

Advantageously the content of hydrogen and/or deuterium in the form of H2 or D2 in the core of at least the degradation resistant length section comprises at least about 0.001 ppm, such as at least about 0.01 ppm, such as from about 0.1 to about 10000 ppm. The amount of hydrogen and/or deuterium can e.g. be determined by determining the resulting absorption at respective hydrogen or deuterium absorption peaks as explained above.

The degradation resistant length section may have any length. Advantageously the degradation resistant length section extends from an end of the PCF. In an embodiment the degradation resistant length section extends from the launching end of the PCF. The launching end is the end which is optically coupled or is adapted to be coupled to a pump laser for feeding light to the PCF. Thereby the degradation resistant length section can be positioned where the high power light is to be fed to the PCF. It has been observed that the major damage to the prior art PCF occurs close to a launching end of the PCF. By ensuring a sufficient load of hydrogen and/or deuterium at the launching end of the PCF, the PCF has a much increased resistance against damage due to loading stress, which further prolongs the lifetime for the whole PCF.

In the context of the present application, the phrase "ring of inclusions" refers to the cladding inclusions typically having substantially equal distance to the core and being aligned in a circular or non-circular ring surrounding the core. Typically, a ring of inclusions is not fully circular, but rather shaped with a number of soft angles, such as in a hexagonal shape. Preferably all the inclusions of a ring of inclusions are of substantially the same size and preferably of same material.

In an embodiment the plurality of inclusions in the cladding region are arranged in a pattern comprising at least two rings of inclusions surrounding the core.

To obtain a PCF which is very good for supercontinuum generation—the center-to-center distance (also referred to as the pitch Λ) is advantageously at least about 1 µm, such as from about 1.5 µm to about 5 µm or larger. The inclusion diameter (d) is advantageously at least about: 0.5 µm, such as from about 1 µm to about 3 µm. The relative diameter/pitch d/Λ is preferably from about 0.4 to about 0.85.

The inclusion diameter or the diameter of the inclusion is also referred to as the characteristic diameter of the inclusion. The phrase "characteristic diameter" is a measure of the size of an inclusion (also called a cladding feature). If the cladding feature is circular, the characteristic diameter is the diameter of the circle of the cladding feature. In case the cladding feature is not circular, the characteristic diameter is in an embodiment determined as the average of the maximum and the minimum extent of the cladding feature or in another embodiment the characteristic diameter is the diameter of a circle having an area corresponding to a calculated or measured area of the cladding feature in question.

The inclusions may have equal or different diameters and the inclusion diameter of the respective inclusions may as mentioned be equal or differ along the length of the fiber.

Embodiments of different and preferred combinations of inclusions and diameters thereof are disclosed in co-pending application DK PA 2014 70146, which is hereby incorporated by reference with respect to the structure of core, cladding region and inclusions. PA 2014 70146 discloses preferred embodiments of the PCF of the invention with the difference that at least a length section of the PCF disclosed in PA 2014 70146 is modified to be or comprise a degradation resistant length section comprising hydrogen and/or deuterium and a hermetic coating as described herein.

In an embodiment the inclusion diameter (d) of the respective inclusions is equal along the length of the fiber. In an embodiment the inclusion diameter (d) of the respective inclusions differs along at least a section of the length of the fiber—e.g. along a tapered section.

The inclusions may—as indicated above—in principle comprise or consist of any kind of material, usually comprising material having a different refractive index than the background material in which the respective inclusion is embedded or comprised. Examples of suitable inclusion materials are disclosed above.

In an embodiment the inclusions comprise gas inclusions, such as air holes—e.g. air holes with air at low or at surrounding (atmosphere pressure). Preferably the gas inclusions are closed on both sides of said degradation resistant length section.

In an embodiment the degradation resistant length section is the whole length of the PCF optionally with exception of closed ends of the PCF.

By closing the ends of the PCF any diffusion of hydrogen and/or deuterium out of the PCF is further reduced which has been found also to add to the degradation resistance and thereby the lifetime of the whole PCF.

The ends of the PCF may for example be closed by collapsing the PCF in a short end section or by fusing a short solid silica length section to the respective ends.

Advantageously the closed ends each have a relatively short length along the length of the PCF in order to reduce any risk of losing light. Advantageously the closed ends each have a length of the PCF of up to about 3 mm, such as up to about 2 mm, such as up to about 1 mm, such as up to about 0.5 mm, such as up to about 0.3 mm, such as up to about 0.2 mm.

In an embodiment the plurality of inclusions in the cladding region of at least the degradation resistant length section comprise an inner cladding region comprising inner inclusions and an outer cladding region comprising outer inclusions. This embodiment has found to provide a very good PCF for supercontinuum generation. Advantageously the inner inclusions are larger than the outer inclusions. Preferably the inner inclusions comprise at least one ring of inclusions and the outer inclusions comprise at least one ring of outer inclusions. In an embodiment more preferably the inner inclusion has a diameter $d_{inner}$ which is at least about 15% larger than a diameter $d_{outer}$ of the outer inclusions, such as at least about 20%, such as at least about 25%, such as at least about 30%. Thereby a PCF for supercontinuum generation with a high stability even in the blue light range is provided. Further due to the degradation resistant length section the PCF will have a long life time even where operating at very high power.

In an embodiment $d_{inner}$ is preferably at least about 1.5 µm, such as from about 1.8 to about 4 µm, such as from about 2 to about 2.5 µm.

In an embodiment $d_{outer}$ is preferably at less than about 2.5 µm, such as from about 0.8 to about 2 µm, such as from about 1 to about 1.8µ.

Advantageously the background material of the inner cladding region and the background material of the outer cladding region are identical and optionally are also identical with the core material. Advantageously the background material of the inner cladding region and the background material of the outer cladding region and optionally the core material are substantially pure silica or optionally silica doped with fluorine.

Advantageously, the outer cladding region comprises at least three rings of outer inclusions.

The structure and the arrangement of the inclusions are in an embodiment as described in co-pending application DK PA 2014 70146 for example as described and shown in FIGS. 2a and 3a of DK PA 2014 70146 wherein the PCF is modified to be or comprises a degradation resistant length section comprising hydrogen and/or deuterium and a hermetic coating as described herein.

In an embodiment the cladding region in at least the degradation resistant length section comprises an inner cladding region comprising the inclusions and an outer cladding region surrounding the inner cladding region wherein the radial distance between an outermost inclusion of the inner cladding region and the main coating is at least about 10 µm. Optionally the material between the inner cladding region and the main coating forms a reservoir for hydrogen and/or deuterium.

By having a relatively large radial distance between the outermost inclusion of the inner cladding region and the main coating a large area may form a reservoir for hydrogen and/or deuterium which gradually can diffuse to the core as the hydrogen and/or deuterium is consumed in the core, thereby maintaining a relatively stable and sufficient concentration of hydrogen and/or deuterium in the core.

In an embodiment the material between the inner cladding region and the main coating forms a reservoir for hydrogen and/or deuterium e.g. the reservoir for hydrogen is porous silica.

In an embodiment the reservoir for hydrogen between the inner cladding region and the main coating comprises glass or plastic with a higher adsorption capacity for hydrogen and/or deuterium than the material of the inner cladding region background material.

The skilled person will be able to find a suitable material by a few hydrogen and/or deuterium loading tests.

The core may in principle have any size. The larger the core, the higher power can be fed to the PCF, however, if the core becomes too large it may become difficult to broaden the band width to a desired degree. In order to provide a broad and stable supercontinuum light it is advantageous that the core has a diameter of at least about 1 µm and preferably at least about 2 µm. Thereby it is ensured that the optical fiber is able to withstand the power necessary for supercontinuum generation and/or high power in general.

In an embodiment the core in at least the degradation resistant length section has a core diameter of about 10 µm or less, such as about 8 µm or less, such as about 6 µm or less. In an embodiment the core diameter is in the range of from about 3 µm, such as about 3 µm to about 7 µm.

In an embodiment the core is defined by the inclusions—i.e. the inclusions surrounding the core have a different refractive index which thereby forms the core.

Advantageously the PCF is made from silica optionally doped as described above.

In an embodiment the material of the core and/or of the cladding region is doped.

In an embodiment an innermost inclusion in at least the degradation resistant length section has a center-to-center distance to the core of less than about 50 µm, preferably less than about 40 µm, such as less than about 30 µm, such as less than about 10 µm.

The core is a solid core.

The term "solid core" means that the core is of solid material substantially without gas comprising voids. In an embodiment the core is a microstructured core.

Advantageously the core is a solid core optionally comprising solid microstructures.

The core is in an embodiment substantially pure silica.

As mentioned above a very beneficial property of a PCF is that by tailoring the size and pitch of the cladding inclusions, the zero dispersion wavelength (ZDW) of the fiber may be tailored.

In an embodiment the PCF has anomalous dispersion for at least one wavelength between 1000 nm and 1100 nm. Preferably the PCF has an anomalous dispersion at about 1030 nm or 1064 nm.

In an embodiment the core of the PCF is single mode at the pump wavelength.

Advantageously the core of the PCF is spatially single mode at 1064 nm.

Spatially single mode means that higher order modes have a loss which is at least 19.3 dB higher than the fundamental mode for a fiber with a length of 2 m. This can e.g. be measured using the $S^2$ method, see "Spatially and spectrally resolved imaging of modal content in large mode-area fibers", J. W. Nicholson et al, Optics Express, vol. 16, Issue 10, page 7233, 2008.

In an embodiment the core of the PCF is single mode at 1030 nm.

In an embodiment the core of the PCF is multi-mode at the pump wavelength, such as at 1064 nm or at 1030.

Advantageously at least the core of the PCF is essentially free of Germanium. It has been found that Germanium may result in certain structural defects within silica and therefore it is desired that the Germanium content is as low as possible. The hydrogen and/or deuterium has been found also to increase the resistance against Germanium induced structural defects and therefore where the PCF comprises Germanium the loading of hydrogen and/or deuterium may be increased.

In an embodiment the entire PCF is essentially free of Germanium. In an embodiment the entire PCF is essentially undoped silica. In an embodiment at least a part of the PCF is doped with Fluorine e.g. at a level of above 1000 ppm.

In the context of the present invention, the phrase "essentially free of Germanium" means that the concentration of germanium is less than about 10 ppm including zero.

In the context of the present invention, the phrase "essentially undoped" means that the concentration of index-changing dopants, such as Ge, B, F, P, Al and/or active materials, such as the rare-earth elements Er or Yb, is at a level below 1000 ppm. In an embodiment the level of dopant is even lower such as about 1 ppm or less.

In an embodiment at least the core of the PCF is essentially free of active material, such as rare earth ions.

In an embodiment the entire PCF is free of active ions.

In the context of the present invention, the phrase "essentially free of active material" means that the concentration of active materials, such as the rare-earth elements Er or Yb, is at a level below 1000 ppm. Preferable the level of active material is even lower such as about 1 ppm or less.

The main coating may be of any material which provides a hermetic coating as defined above.

Examples of suitable materials for the main coating are materials comprising nitride (such as carbon nitride, silicon nitride, boron nitride, silicon nitride and/or siliconoxy nitride), carbon, aluminum, metallic glass or a combination comprising one or more of the before mentioned.

A particularly preferred material for the main coating is carbon.

The thickness of the main coating is determined in dependence of the type of material. Generally it is desired to select material for the main coating which is hermetic at relatively low thickness thereby ensuring a high flexibility and bendability of the PCF without any substantial risk of formation of cracks.

In an embodiment the main coating has a thickness of from about 5 nm to about 10 µm, such as from 10 nm to about 5 µm, such as from about 20 nm to about 1 µm.

In an embodiment the main coating has a thickness of about 30 nm.

For a metallic main coating the thickness is advantageously between 15 µm and 60 µm.

In an embodiment the main coating is diffusion open for hydrogen and/or deuterium at a temperature above $T_o$, where $T_o$ is larger than $T_h$. Thereby the hydrogen and/or deuterium can be loaded into the PCF after the coating has been applied. This provides a preferred embodiment of producing the PCF since the main coating protects the fiber during handling both mechanically and against dust. Furthermore a more homogeneous and accurate content of hydrogen and/or deuterium can be loaded. It has been found that immediately after loading a PCF without the main coating will immediately start to lose the loaded hydrogen and/or deuterium and in practice an undesired large amount of hydrogen and/or deuterium may be lost prior to application of the main coating. Where the main coating is applied after the loading it is therefore desired that a larger amount of hydrogen and/or deuterium initially is loaded into the PCF.

Preferably $T_o$ is at least about 25° C., preferably $T_o$ is in the interval from about 50° C. to about 300° C., such as at least about 70° C., such as at least about 100° C. In an embodiment $T_o$ is determined at 1 bar. In an embodiment $T_o$ is determined at 100 bars.

In general it is desired that $T_o$ is larger than the temperature (or the expected temperature) of the PCF in use. On the other hand $T_o$ should advantageously not increase the softening temperature of the material with the risk of deforming the material.

The PCF may advantageously comprise one or more additional coatings above or below the main coating.

Such additional coating may have the purpose of providing additional mechanical protection, of reducing any risk of cracks in the main coating and/or of providing an outermost appearance and/or touch.

The additional coating is preferably a polymer coating advantageously comprising acrylate, polyimide, polyurethane, silicone or any combinations thereof.

In an embodiment where the main coating is carbon an additional coating of metal, such as aluminum, gold, copper, nickel, metallic glass or a combination or an alloy comprising at least one of the mentioned metals.

In an embodiment the PCF comprises at least one tapered length section wherein the core in a first end of the tapered length section has a core diameter D1 and the core in a second end of the tapered length section has a core diameter D2, wherein D1 is larger than D2, preferably D2 is up to about 0.95 times D1, such as from about 0.1 to about 0.9 times D1. Advantageously the first end is the launching end.

It has been found that by tapering the PCF the supercontinuum generation properties of the PCF may be increased e.g. as described in PCT/DK2014/050205. In an embodiment the PCF is as described in PCT/DK2014/050205 with the difference that the PCF is modified to be or to comprise a degradation resistant length section comprising hydrogen and/or deuterium and a hermetic coating as described herein.

Preferably the first end of the tapered length section is at a launching end of the fiber or up to 5 cm along the length from the launching end of the fiber, preferably the first end of the tapered length section is adjacent to or comprised in the degradation resistant length section.

Thereby the PCF is in particular protected against degradation where the peak power is very high.

In an embodiment the PCF does not comprise any splicing.

In an embodiment the PCF comprises two or more spliced fiber length sections, wherein at least one spliced fiber length section is or comprises the degradation resistant length section.

In order to provide an optimal supercontinuum it has been found that a fiber comprising fiber length sections with different properties may be advantageous e.g. as described in PCT/DK2014/050206.

In an embodiment the PCF comprises a first length section comprising or consisting of the degradation resistant length section and a second length section spliced to the first length section wherein the second length section has a lower content of hydrogen and/or deuterium than the degradation resistant length section.

In an embodiment the PCF comprises
a first length section with a first length L1, wherein the inclusions of the optical fiber at least at a first cross-section through the first length section perpendicularly to the longitudinal axis have a first pitch Λ1, a first inclusion diameter d1 and a first relative size d1/Λ1 of inclusions,
a second length section with a second length L2, wherein the microstructure elements of the optical fiber at least at a second cross-section through the second length section perpendicularly to the longitudinal axis have a second pitch Λ2, a second inclusion diameter d2 and a second relative size d2/Λ2 of inclusions,
at least one of the first length L1 and the second length L2 comprises or consists of the degradation resistant length section.

One or more of the length sections of fiber may be tapered.

In an embodiment the PCF of the invention is as described in PCT/DK2014/050206 with the difference that at least a length section of the PCF disclosed in PCT/DK2014/050206 is modified to be a degradation resistant length section comprising hydrogen and/or deuterium and a hermetic coating as described herein.

In an embodiment PCF comprises a mode-adaptor extending along the length of the PCF in at least a mode-field adapting length section extending from a launching end of the PCF or up to about 5 cm from the launching end of the PCF. Preferably the mode-field adapting length section has a length of at least about 5 cm, such as at least about 10 cm, such as at least about 20 cm. Advantageously the mode-field adapting length section is partly or fully comprised in the degradation resistant length section.

The invention also comprises a method of producing the PCF comprising
producing a preform comprising a preform structure for the core and the cladding region of the PCF,
drawing the preform to obtain the core and cladding region of the PCF,
subjecting at least the degradation resistant length section of the PCF to hydrogen and/or deuterium loading, and
applying the main coating to at least the degradation resistant length section of the PCF.

Preferably the degradation resistant length section is the whole length of the PCF optionally with exception of the closed ends of the PCF. Advantageously the closed ends are as described above.

In an embodiment the method comprises subjecting the PCF to hydrogen and/or deuterium loading prior to application of the main coating.

Where the hydrogen and/or deuterium loading is performed prior to application of the main coating the hydrogen and/or deuterium loading comprises placing the PCF in a chamber containing hydrogen and/or deuterium at a pressure of at least about P1 and temperature of at least about T1 for a duration of at least t1.

To provide a relatively fast loading of hydrogen and/or deuterium the temperature and optionally the pressure are advantageously raised.

In an embodiment T1 is preferably at least 40° C., such as from about 50° C. to about 250° C., such as from about 100° C. to about 800° C., such as up to about 500° C., such as up to about 200° C. In practice the material of the PCF sets the upper limit for the temperature T1.

The loading time t1 is preferably at least about 1 hour, such as from about 2 hours to about 200 hours, such as from about 24 hours to about 96 hours.

The loading pressure P1 is preferably from about 1 bar, such as from above 1 bar to about 250 bars, such as from about 50 bars to about 200 bars, such as from about 100 bars to about 200 bars.

In this embodiment it is desired that the main coating is applied within a few hours of the loading because otherwise much of the loaded hydrogen and/or deuterium may diffuse out of the fiber. Preferably the main coating is applied to the PCF within about 5 hours, such as within about 2 hours of termination of the loading.

In a preferred embodiment the method comprises subjecting the PCF to hydrogen and/or deuterium loading after application of the main coating.

Thereby the loaded hydrogen and/or deuterium will almost not diffuse out of the PCF after loading and as described above the quality of the PCF may be increased. Further the amount of hydrogen and/or deuterium loaded may be lower which may result in a lower loading time.

Preferably the method comprises
producing a preform comprising a preform structure for the core and the cladding region of the PCF,
drawing the preform to obtain the core and cladding region of the PCF,
applying the main coating to the PCF,
subjecting the PCF to hydrogen and/or deuterium at a temperature of at least about $T_o$, and
cooling the PCF to $T_h$ or less.

The cooling may be performed by passive cooling (just letting the PCF cool down e.g. at room temperature) or an active cooling e.g. blowing the PCF using cold air.

In an embodiment where the main coating is applied prior to loading the hydrogen and/or deuterium, loading preferably comprises placing the PCF in a chamber containing hydrogen and/or deuterium at a pressure of at least about P2 and temperature of at least about $T2>T_o$ for a duration of at least t2.

In an embodiment T2 is preferably at least 50° C., such as from about 75° C. to about 250° C., such as from about 100° C. to about 200° C. or higher. In practice the material of the main coating or any additional coating(s) which may have been applied sets the upper limit for the temperature T2, which means that for some types of main coatings the temperature T2 may be up to about 500° C. or even up to about 800° C.

The loading time T2 is preferably at least about 1 hour, such as from about 2 hours to about 200 hours, such as from about 24 hours to about 96 hours.

The loading pressure P2 is preferably from about 1 bar, such as from above 1 bar to about 250 bars, such as from about 50 bars to about 200 bars, such as from about 100 bars to about 200 bars.

Where the PCF comprises gas inclusions, the method of producing the PCF preferably comprises closing the gas inclusions on either side of the degradation resistant length section. The method preferably comprises closing the gas inclusions in both ends de of the PCF.

In an embodiment the method comprises closing the gas inclusions prior to subjecting the PCF to hydrogen and/or deuterium loading thereby reducing the risk of hydrogen and/or deuterium out-diffusion via the inclusions.

In an embodiment the method comprises subjecting the PCF to hydrogen and/or deuterium loading prior to closing the gas inclusions at the ends of the fiber. In an embodiment the loading may comprise loading via the not closed gas inclusion followed by closing the gas inclusions at the ends of the fiber. In this embodiment the main coating may be applied prior to loading.

The material of the main coating as well as the thickness thereof may be as described above.

In an embodiment the main coating is applied to the PCF by chemical vapor deposition (CVD) or similar or modified deposition methods.

In an embodiment the main coating is a carbon coating and the method comprises applying the main carbon coating by a chemical vapor deposition process. Advantageously the CVD process comprises pulling the fiber through a reactor chamber of a reactor and subjecting the fiber in the reactor chamber to a reactor gas at a temperature of at least about 700° C. Preferably the temperature is in the interval of about 700° C. to about 1100° C., such as about 700° C. to about 900° C. A temperature above 900° C. may lead to formation of a carbon coating with a diamond like structure.

The method of carbon coating the fiber may e.g. be as described in U.S. Pat. No. 5,000,541.

The reactor gas may advantageously comprise carbonaceous composition, preferably comprising alkyn ($C_nH_{2n-2}$), such as acetylene ($C_2H_2$) and/or alkene ($C_nH_{2n+2}$), such as ethane ($C_2H_6$), where n is 2 to 10, such as 2 to 4. Preferably the reactor gas is substantially free of oxygen.

It has been found to be very effective to applying the main carbon coating immediately after drawing the fiber in a drawing tower. Thereby it is ensured that the surface of the fiber is not contaminated prior to application of the main coating and further it has been found that by applying the main carbon coating immediately after drawing the fiber without cooling down of the fiber to below a reaction temperature for the reactor gas prior to application of the carbon coating, the fiber need not being reheated prior to the carbon coating. In an alternative embodiment the fiber is reheated to the reaction temperature. The reaction temperature in the reaction chamber is advantageously at least about 700° C., such as from about 800° C. to about 1100° C.

Advantageously the reactor is an integrated part of the drawing tower, preferably such that the fiber is pulled through the reactor chamber for application of the carbon coating prior to being coiled—i.e. in an in-line process.

In an embodiment the method comprises applying an additional coating onto the carbon coating. The additional coating is preferably a polymer coating or a metal coating such as described above. The additional coating is preferably applied onto the carbon coating in the drawing tower prior to coiling the fiber.

In an embodiment the main coating is a metal coating and the method comprises applying the main metal coating by pulling the fiber through a liquid metal melt, where the temperature of the fiber as it enters the melt is lower than the temperature of the metal melt.

The temperature of the metal melt depends on the type of metal. In an embodiment the metal coating is applied to the fiber in the drawing tower after the fiber is drown and at least partially cooled down and preferably in an in-line process prior to coiling the fiber.

In an embodiment the method comprises application of at least one additional coating e.g. outside the main coating.

The invention also comprises a supercontinuum light source comprising the PCF as described above, and a pump source arranged to feed pump pulses to a launching end of the PCF.

In an embodiment the PCF is arranged to generate a supercontinuum light with a broadened band width relative to the bandwidth of the pump pulses.

Advantageously the PCF is arranged to generate a supercontinuum light with a band width relative to the bandwidth of the pump pulses which is broadened with at least about 100%, such as at least about 200%.

In an embodiment the generated supercontinuum has a band width spanning at least an octave.

The pump source can be any kind of pump source capable of providing pump pulses of sufficiently high energy e.g. a mode locked pump source such as a MOPA with or without pulse picker (gating means).

The pump pulses preferable have a relative high peak power. In an embodiment pump pulses generated by the pulse source are high peak power pulses having a peak power at the launching end of the PCF of at least about 5 kW, such as at least about 10 kW, such as at least about 15 kW, such as at least about 20 kW.

In an embodiment the pump pulses generated by the pulse source have a pulse duration of up to about 200 ps, such as up to about 100 ps, such as up to about 50 ps, such as up to about 30 ps, such as up to about 10 ps, such as up to about 8 ps, such as up to about 5 ps, such as up to about 3 ps, such as up to about 1 ps.

Advantageously the pump pulses generated by the pulse source have a pulse duration of at least about 200 fs, such as of at least about 1 ps, such as of at least about 5 ps.

Preferably the pump pulses generated by the pulse source have a repetition rate of at least about 100 kHz, least about 10 kHz, such as of at least about 1 MHz, the repetition rate is preferably tunable e.g. using an EOM (electro-optic modulator), an AOM (acousto-optic modulator) or an AOTF (acousto-optic tunable filter) which simultaneously acts as a wavelength filter.

In an embodiment the pump pulses generated by the pulse source have a wavelength of from about 900 nm to about 1100 nm, such as about 1030 or about 1064 nm.

In an embodiment the supercontinuum light source has an average output power of at least about 1 W, such as at least about 5 W, such as at least about 10 W, such as at least about 20 W, such as at least about 50 W, such as at least about 100 W or even at least about 500 W. Generally it has been found that because of the degradation resistant length section of the PCF of the invention it has become possible to provide a high power supercontinuum light source with a desired high output power which simultaneously has a surprisingly long life time.

In an embodiment the supercontinuum light source has an output comprising wavelengths less than about 600 nm, such as less than about 550 nm, such as less than about 450 nm, such as less than about 420 nm, such as less than about 410 nm, such as less than about 400 nm, such as less than about 380 nm, such as less than about 360 nm.

In an embodiment the supercontinuum light source has an output comprising wavelengths more than about 1800 nm, such as more than about 2000 nm such as more than about 2200 nm.

In an embodiment the supercontinuum light source further comprises a spectral filtering unit, arranged to filter the output of the supercontinuum source to a filtered SC output having a central wavelength of $\lambda 1$ and an output bandwidth BW1, wherein at least one of the central wavelength of $\lambda 1$ and the output bandwidth BW1 is tunable. The output bandwidth BW1 is advantageously (at least in one tuning) less than about 5 nm. The spectral filtering unit e.g. comprises an AOTF.

The invention also comprises an illumination source comprising the supercontinuum light source as described above. Preferably the illumination source is suitable for stimulated emission depletion.

In an embodiment the illumination source is adapted for fluorescence Imaging; Fluorescence Lifetime Imaging (FLIM); Total Internal Reflection Fluorescence (TIRF) Microscopy; fluorescence resonance energy transfer (FRET); broadband Spectroscopy; nanophotonics; flow cytometry; industrial inspection, such as metrology; ring-down spectroscopy, such as gas sensing; analytical spectroscopy, such as hyperspectral spectroscopy, crop analysis e.g. of fruits and time of flight spectroscopy (TCSPC); single Molecule Imaging and/or combinations thereof.

In an embodiment, the microscope is preferably an optical fluorescence microscope, such as an optical fluorescence microscope based on fluorescence life time imaging (FLIM), a total Internal Reflection Fluorescence (TIRF) Microscopy.

In an embodiment, the spectroscope is preferably a broadband spectroscope.

The invention also comprises an optical coherence tomograph for Optical Coherence Tomography (OCT), wherein the tomograph comprises the illumination source as described above.

The invention also comprises an industrial inspection comprising the illumination source as described above.

All features of the inventions and embodiments of the invention as described above including ranges and preferred ranges can be combined in various ways within the scope of the invention, unless there are specific reasons not to combine such features.

BRIEF DESCRIPTION OF THE DRAWINGS

The above and/or additional objects, features and advantages of the present invention will be further elucidated by the following illustrative and non-limiting description of embodiments of the present invention, with reference to the appended drawings.

The figures are schematic and may be simplified for clarity. Throughout, the same reference numerals are used for identical or corresponding parts.

Further scope of applicability of the present invention will become apparent from the description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

Figure 1:
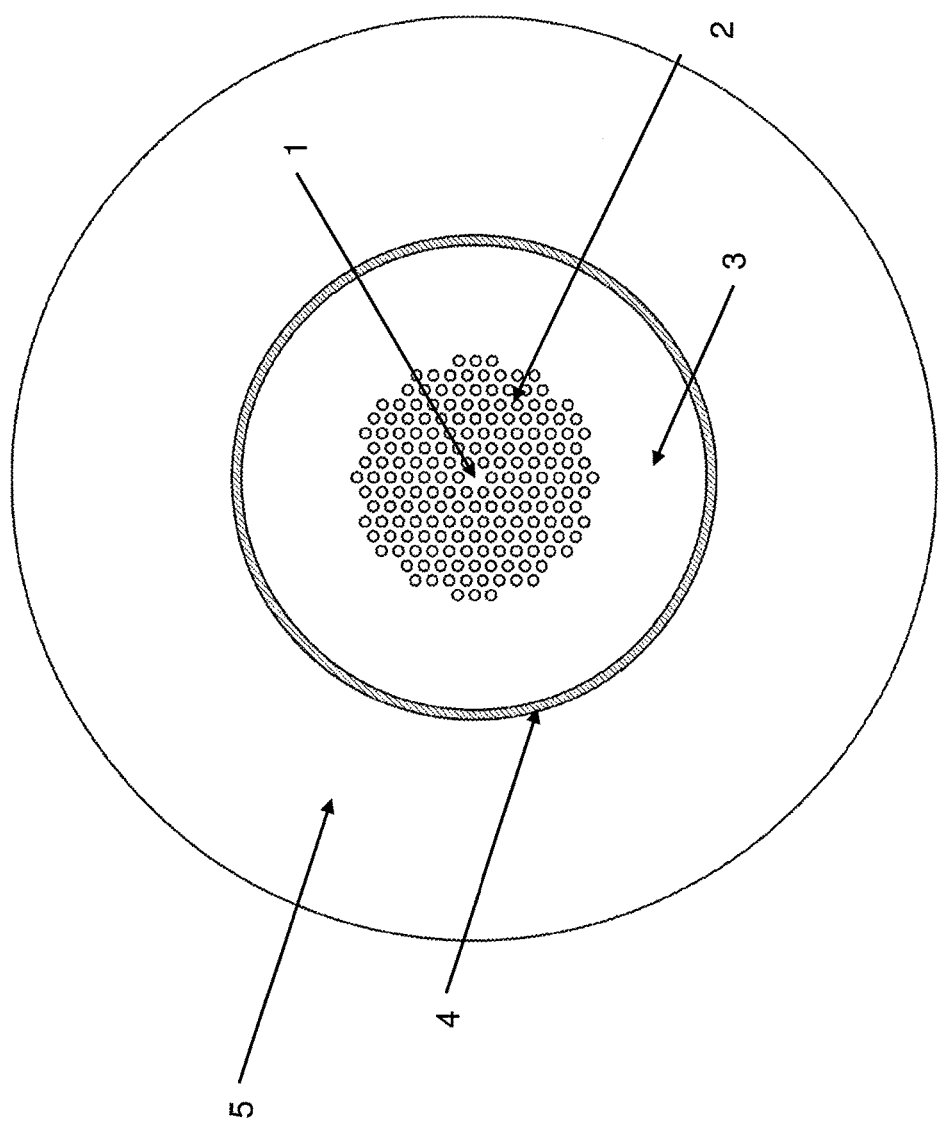
FIG. 1 is a cross-sectional view of a PCF of an embodiment of the invention.

The PCF shown in FIG. 1 has a core 1 and a cladding region 2, 3 surrounding the core 1. The PCF has a not shown length and a longitudinal axis which in the shown embodiment is coincident with the center axis of the core. The cladding region comprises an inner cladding region 2 and an outer cladding region 3. The inner cladding region comprises a plurality of microstructures in the form of inclusions extending along the longitudinal axis of the PCF. As described above the inclusions can comprise any material, but are advantageously gas inclusions, such as air inclusions. Advantageously the inclusions are collapsed at one or more positions along the length of the fiber such as at each end of a degradation resistant length section which in one embodiment is substantially the whole length of the PCF as described above.

As it can be seen the cross sectional view of the PCF is a cross sectional view in the degradation resistant length section of the PCF, which as mentioned may comprise the whole length of the PCF or only a part of the length of the PCF.

The PCF is loaded with not shown hydrogen and/or deuterium preferably in the form of hydrogen molecules and/or deuterium molecules (H2/D2). The hydrogen and/or deuterium will usually be in both the core 1 and the cladding region 2, 3. The PCF comprises a main coating 4 which is hermetic for hydrogen and/or deuterium at a temperature below $T_h$. Different types of preferred main coatings are described above.

The PCF comprises an additional coating 5 for mechanical protection and optionally for providing the PCF with a desired appearance and/or texture.

In use when the PCF is subjected to high peak power of light, such as described above, the light may cause defects in the core material. This effects, which are believed to be caused by different chemical reactions are sometimes called photo induced degradation or photodarkening. The hydrogen and/or deuterium has been found to mitigate the degradation by binding to the material e.g. to terminate free radicals.

As the hydrogen and/or deuterium in the core 1 is/are spent, fresh hydrogen and/or deuterium migrates to the core 1 from the cladding region 2, 3. Due to the main coating 4 which is hermetic for hydrogen and/or deuterium when the PCF is in use or stored prior to use, the required amount of hydrogen and/or deuterium can be relatively low and/or the PCF is protected against excessive degradation for a long time, such as up to several years e.g. 3, 4 or even 5 years or longer.

The PCF is advantageously of silica e.g. doped as described above.

Figure 2:
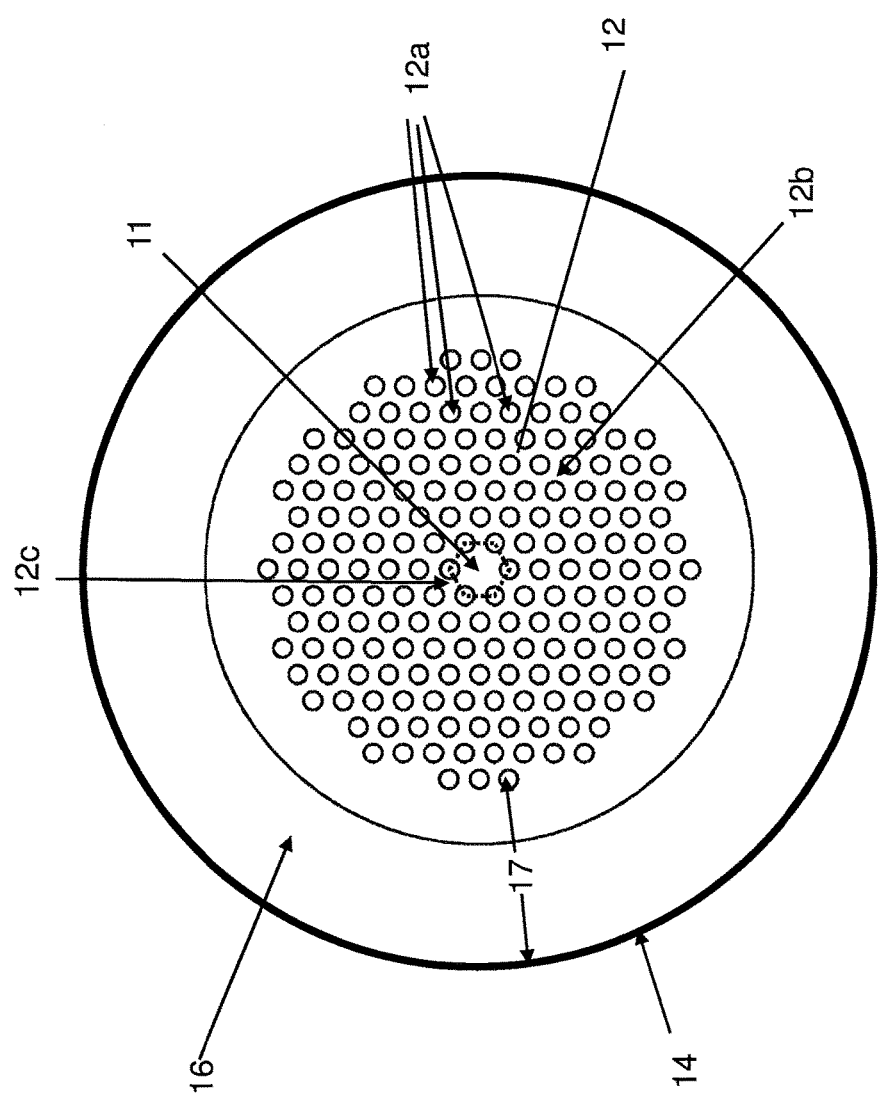
FIG. 2 is a cross-sectional view of a PCF of another embodiment of the invention.

The PCF shown in FIG. 2 has a core 11 and a cladding region 12 surrounding the core 11. The PCF has a not shown length and a longitudinal axis which in the shown embodiment is coincident with the center axis of the core 11. The cladding region 12 comprises a plurality of microstructures 12a in the form of inclusions in the cladding background material 12b. The inclusions 12a extend along the longitudinal axis of the PCF. As described above the inclusions can comprise any material, but are advantageously gas inclusions, such as air inclusions. Advantageously the inclusions are collapsed at one or more positions along the length of the fiber such as at each end of a degradation resistant length section which in one embodiment is substantially the whole length of the PCF as described above.

The plurality of inclusions 12*a* is arranged in the cladding region in a pattern comprising several rings of inclusions surrounding the core. The innermost ring of inclusions surrounding the core is marked with the dotted ring 12*c*.

As it can be seen the cross sectional view of the PCF is a cross sectional view in the degradation resistant length section of the PCF, which as mentioned may comprise the whole length of the PCF or only a part of the length of the PCF.

The PCF comprises a main coating 14 which is hermetic for hydrogen and/or deuterium at a temperature below $T_h$. Different types of preferred main coatings are described above.

The PCF comprises an additional material layer 16 which is sufficiently far from the core 11 to have any effect as a cladding (i.e. the refractive index of the material of the material layer 16 does not influence the light guiding of the core).

The radial distance 17 between an outermost of the inclusions 12*a* of the cladding region and the main coating 14 is at least about 10 μm.

The additional material layer 16 may be of the same or of a different material than the cladding background material 12*b*. The additional material layer 16 is advantageously selected to have a high capacity for hydrogen and/or deuterium to thereby act as a reservoir for hydrogen and/or deuterium.

The PCF is loaded with not shown hydrogen and/or deuterium as described above. The hydrogen and/or deuterium will usually be in both the core 11 and the cladding region 12 as well as in the additional material layer 16

In use when the PCF is subjected to high peak power of light, such as described above, and as the hydrogen and/or deuterium in the core 11 is/are spent fresh hydrogen and/or deuterium migrated to the core 11 from the cladding region 12 and the material layer 16. Due to the main coating 14 which is hermetic for hydrogen and/or deuterium when the PCF is in use or stored prior to use, the required amount of hydrogen and/or deuterium can be relatively low and/or the PCF is protected against excessive degradation for long time, such as up to several years e.g. 3, 4 or even 5 years or longer.

The PCF is advantageously of silica e.g. doped as described above.

Figure 3:
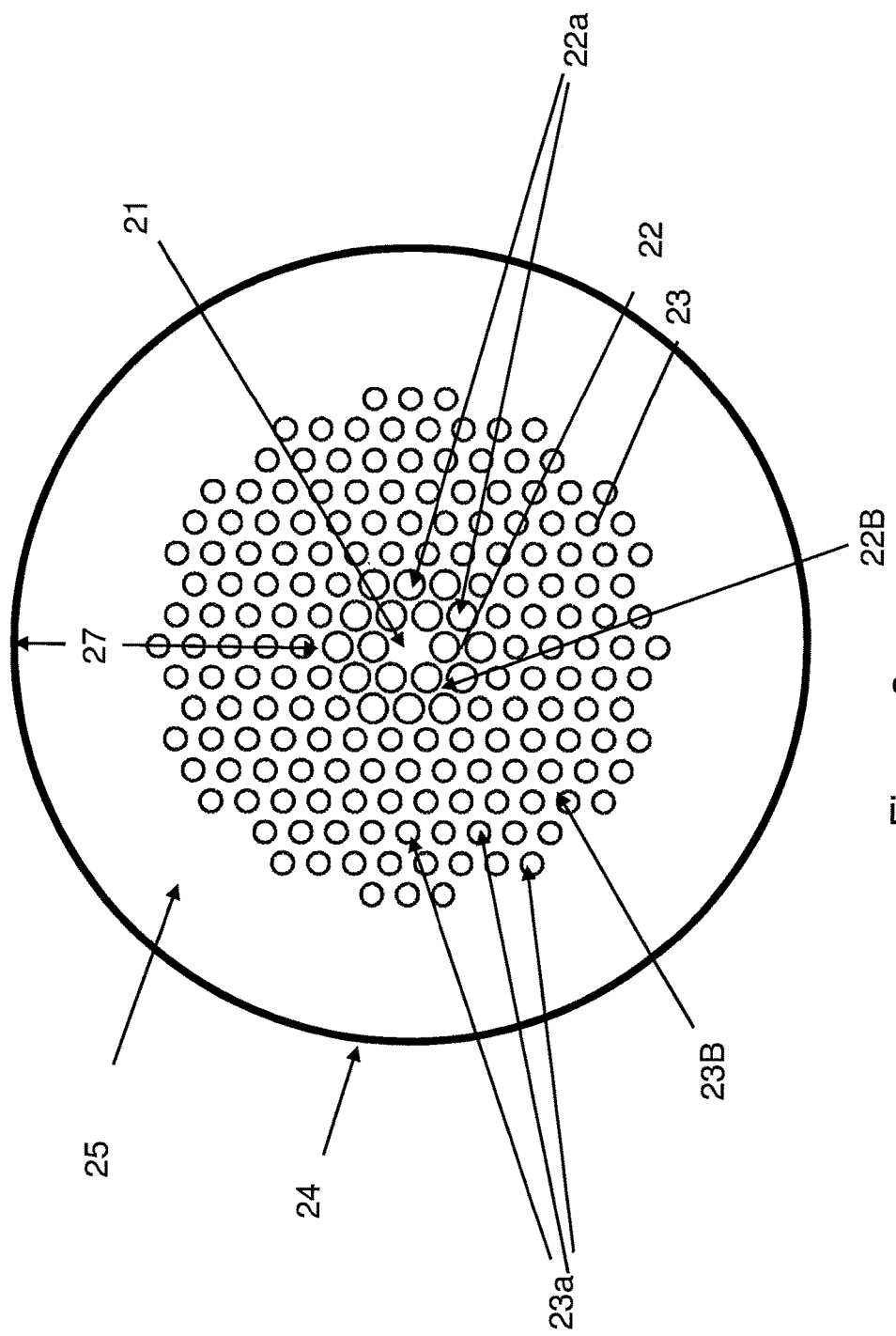
FIG. 3 is a cross-sectional view of a PCF of yet another embodiment of the invention.

The PCF shown in FIG. 3 has a core 21 and a cladding region 22, 23 surrounding the core 21. The PCF has a not shown length and a longitudinal axis which in the shown embodiment is coincident with the center axis of the core 21.

The cladding region comprises an inner cladding region 22 and an outer cladding region 23. The inner cladding region 22 comprises inner inclusions 22*a* in the inner cladding background material 22*b*. The outer cladding region 23 comprises outer inclusions 23*a* in the outer cladding background material 22*b*.

The inner inclusions 22*a* comprise two rings of inner inclusions and the outer inclusions 23*a* comprise 5 rings of outer inclusions.

The inclusions 22*a*, 23*a* extend along the longitudinal axis of the PCF. As described above the inclusions can comprise any material, but are advantageously gas inclusions, such as air inclusions. Advantageously the inclusions are collapsed at one or more positions along the length of the fiber such as at each end of a degradation resistant length section which in one embodiment is substantially the whole length of the PCF as described above.

The background material 22*b* of the inner cladding region 22 and the background material 23*b* of the outer cladding region 23 and optionally the core material are advantageously of the same material such as of silica optionally doped with fluorine.

As it can be seen the cross sectional view of the PCF is a cross sectional view in the degradation resistant length section of the PCF, which as mentioned may comprise the whole length of the PCF or only a part of the length of the PCF.

The PCF comprises a main coating 24 which is hermetic for hydrogen and/or deuterium at a temperature below $T_h$. Different types of preferred main coatings are described above.

The PCF comprises an additional material layer 26 which is sufficiently far from the core 21 to have any effect as a cladding.

The additional material layer 26 is in this embodiment the same as the cladding background material 23*b*.

The radial distance 27 between an outermost of the inner inclusions 22*a* of the inner cladding region and the main coating 24 is at least about 10 μm.

The PCF is loaded with not shown hydrogen and/or deuterium as described above. The hydrogen and/or deuterium will usually be in both the core 21 and the cladding region 22, 23 as well as in the additional material layer 26

In use when the PCF is subjected to high peak power of light, such as described above, and as the hydrogen and/or deuterium in the core 21 is/are spent, fresh hydrogen and/or deuterium migrate to the core 21 from the cladding region 22, 23 and the material layer 26.

Figure 4:
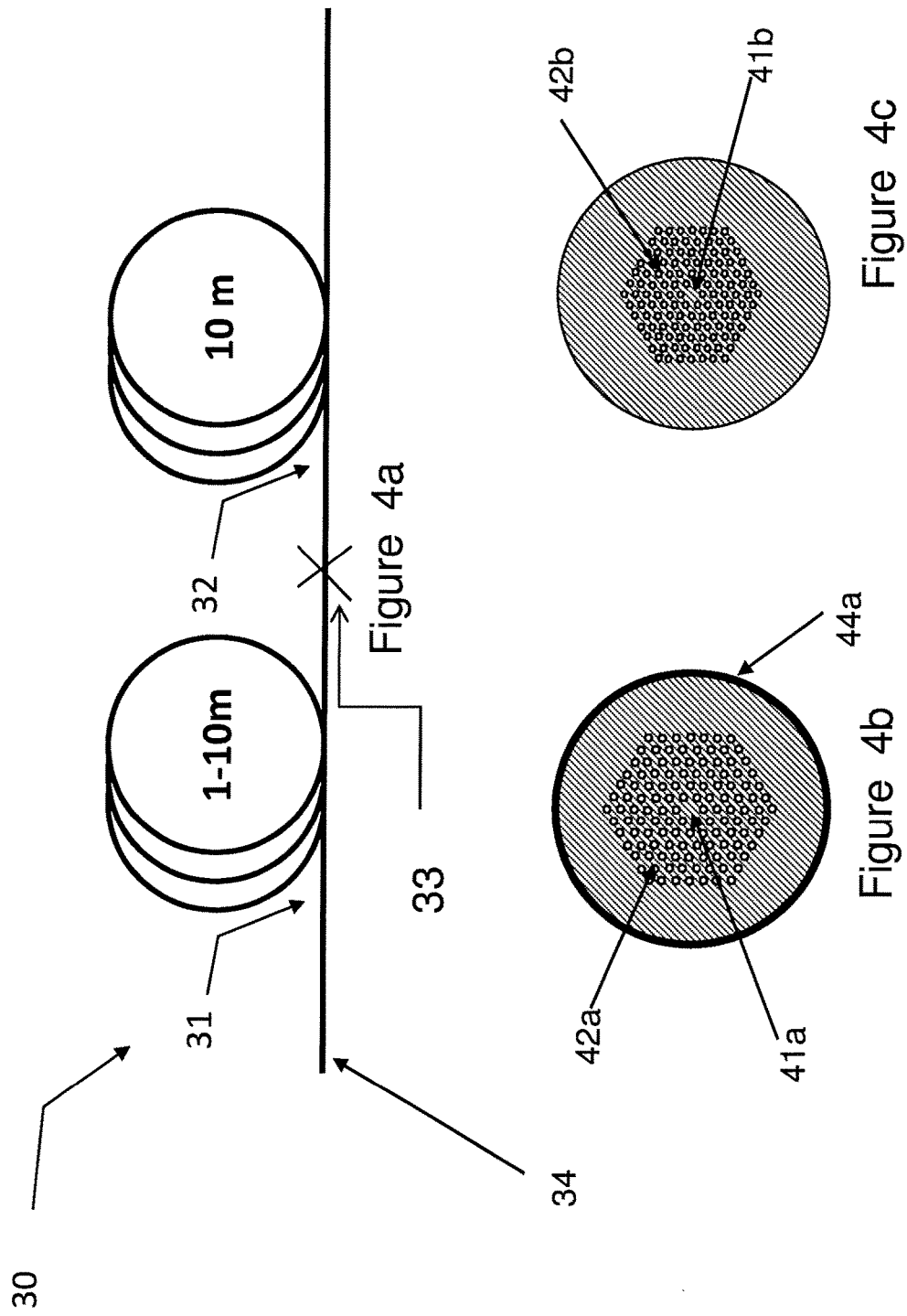
FIGS. 4a, 4b and 4c show respectively a side view of a PCF according to an embodiment of the invention and cross-sections through a first and second length section thereof.

FIGS. 4*a*, 4*b* and 4*c* show an embodiment of a PCF 30 which comprises two spliced fiber length sections, wherein at least one spliced fiber length section is or comprises a degradation resistant length section as described above. This type of fiber is also called a spliced cascaded optical fiber. FIG. 4*b* is a cross sectional view of a first length section 31 and FIG. 4*c* is a cross sectional view of a second 32 length section spliced to the first length section. Preferably at least the first length section 31 of the PCF is a degradation resistant length section as described above.

The PCF 30 is arranged for generating supercontinuum light upon feeding of light having a first wavelength $\lambda_1$ e.g. from about 900 nm to about 1100 nm into the launching end 34 of the PCF 30, Along its length the optical fiber 30 comprises a first length section 31, a second length section 32 and a splicing 33 between the first and second length sections 32, 33. The optical fiber 30 may optionally include a not shown end cap to close the inclusions.

The first length section 31 has a core 41*a* with a first core diameter $W_1$ and a cladding region 32*a* with a first pitch $\Lambda_1$, a first inclusion diameter $d_1$ and a first relative size of inclusions $\Lambda_1/d_1$. The first length section comprises a main coating 44*a* which is hermetic for hydrogen and/or deuterium at a temperature below $T_h$. Different types of preferred main coatings are described above. At least the first length section is loaded with hydrogen and/or deuterium.

The second length section 32 has a core 41*b* with a second core diameter $W_2$ and a cladding region 42*b* with a second pitch $\Lambda_2$, a second inclusion diameter $d_2$ and a second relative size of inclusions $\Lambda_2/d_2$.

Advantageously at least one of the dimensions the first core diameter $W_1$, the first pitch $\Lambda_1$, the first inclusion diameter $d_1$ and the first relative size of inclusions $\Lambda_1/d_1$ differs from the corresponding dimension the second core diameter $W_2$, the second pitch $\Lambda_2$, the second inclusion diameter $d_2$ and the second relative size of inclusions $\Lambda_2/d_2$ of the second length section 32.

Throughout the first length section 31 the dimensions of the fiber are substantially constant and throughout the second length section 32 dimensions of the fiber are substantially constant.

The respective lengths of the first and the second length section 31, 32 are in this embodiment respectively 1-10 m and 10 m. However, it should be understood that these lengths are only given as example and the fiber length sections may in principle have any other lengths.

Figure 5:
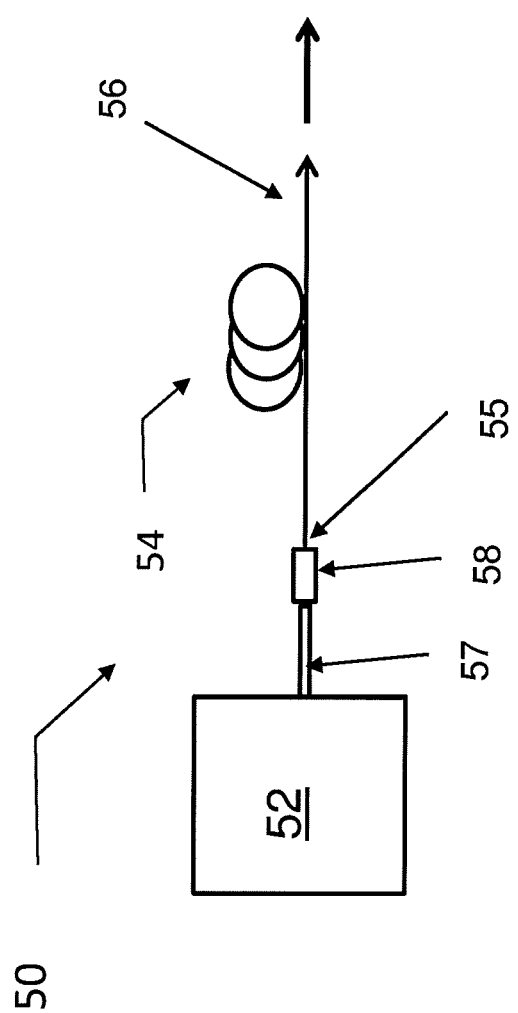
FIG. 5 is a schematic representation of an embodiment of a supercontinuum light source of radiation according to the invention.

FIG. 5 is a schematic representation of a supercontinuum light source. The supercontinuum light source 50 comprises a PCF 54 comprising a degradation resistant length section as described above and a pump source 52. The PCF has two ends: a launching end 55 and an output end 56. In FIG. 5, the launching end 55 of the PCF 54 has or is optically connected to a mode adaptor 58 for adapting the mode of the pump pulses from the pump source 52. In FIG. 5, the mode adaptor 58 is shown as if it is larger than the optical fiber 54; however, this is only for illustrative purpose and in practice the mode adaptor may have any suitable outer dimensions e.g. outer dimensions similar to those of the optical fiber 54. Even though the output end 56 of the optical fiber 54 is shown as if it is a free end, the output end could have an end cap, or it could be spliced to further equipment.

The pump light source 52 has an output 53 arranged to feed light into the PCF 54 via a delivery fiber 57 and via the mode adaptor 58 and a supercontinuum spectrum is generated in the PCF and output from the output end 56 of the PCF. The delivery fiber 57 may e.g. be omitted or replaced e.g. by an optical element such as a lens.

Figure 6:
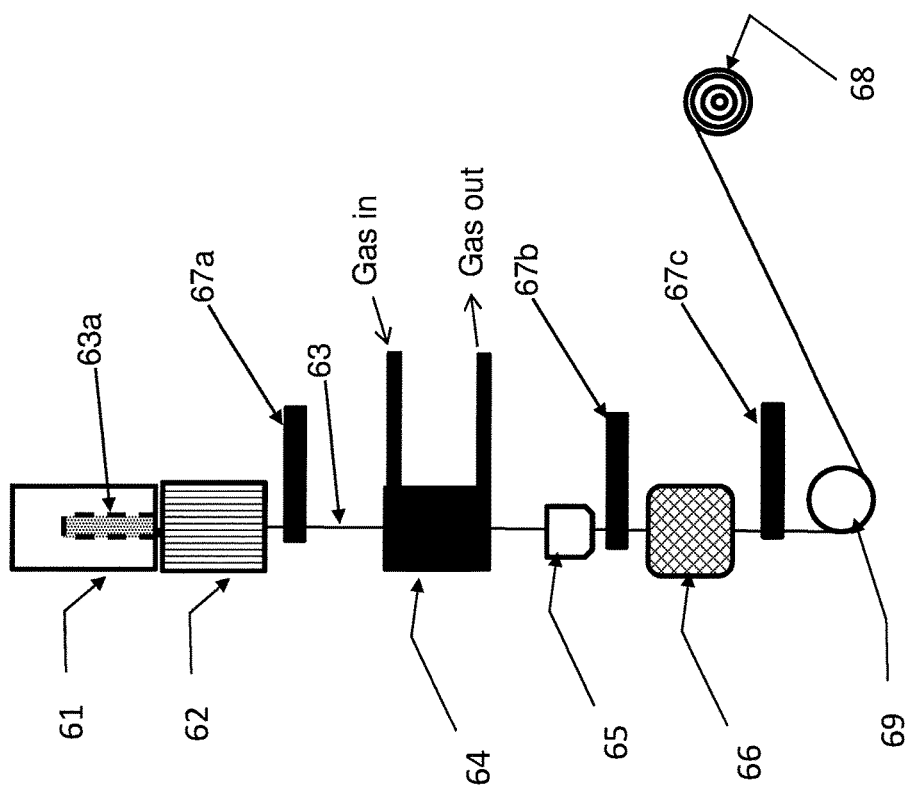
FIG. 6 is a schematic drawing of a drawing tower where the main coating and an additional coating is applied in an in-line process and where the drawing tower comprises a coating station comprising a reactor for application of a carbon coating.

The drawing tower shown in FIG. 6 is in the process of drawing a PCF 63 from a preform 63a. The preform is enclosed in a pressure control chamber 61 comprising one or more pressure chambers for controlling the pressure of gas inclusions in the PCF. A bottom part extends into a furnace 62, where the bottom part of the preform is heated to enable drawing the PCF 63. The velocity of the PCF and thereby the PCF diameter is controlled by the drawing wheel 69 pulling the PCF through the various stations of the drawing towers. The velocity of the PCF 63 is adjustable and by adjusting the temperature of the furnace 62 and the velocity of the PCF 63 the diameter of the fiber may be adjusted. The PCF is passed through a monitoring station 67a where the diameter of the PCF from the furnace 62 is monitored in-line.

From the monitoring station 67a the PCF 63 is passed to the coating station for application of a main carbon coating.

The PCF 63 is passed through the reactor chamber of the reactor 64 and as indicated with the arrows a reaction is introduced and withdrawn in a continuous flow to keep a substantially constant amount of fresh gas in the reactor.

To ensure that the PCF 63 has a sufficiently high temperature when entering the reactor 64, it is desired that the reactor is positioned relatively close to where the PCF 63 leaves the furnace 62. Alternatively an oven may be positioned prior to the reactor for preheat the PCF 63, however the latter alternative embodiment is not preferred due to the additional cost of the oven.

The thickness of the carbon layer may be adjusted e.g. by adjusting the concentration of the reactive carbonaceous gas in the reaction gas or by changing the PCF velocity.

From the reactor the carbon coated PCF passes to an additional coating station for application of an additional coating, which in the shown embodiment is a polymer coating station 65. From the coating station the coated PCF is passed to a concentricity monitor 67b and further to a curing station 66 where the polymer coating is cured by light.

From the curing station 66 the coated PCF is passed further to an additional monitor 67c for monitoring the fiber diameter. From the drawing wheel 69 the coated PCF 63 passed to spooling onto a spool 68.

The coated PCF 63 may advantageous be hydrogen or deuterium loaded on the spool by subjection the coated PCF on the spool 68 to the hydrogen and/or deuterium in a loading chamber.

Figure 7:
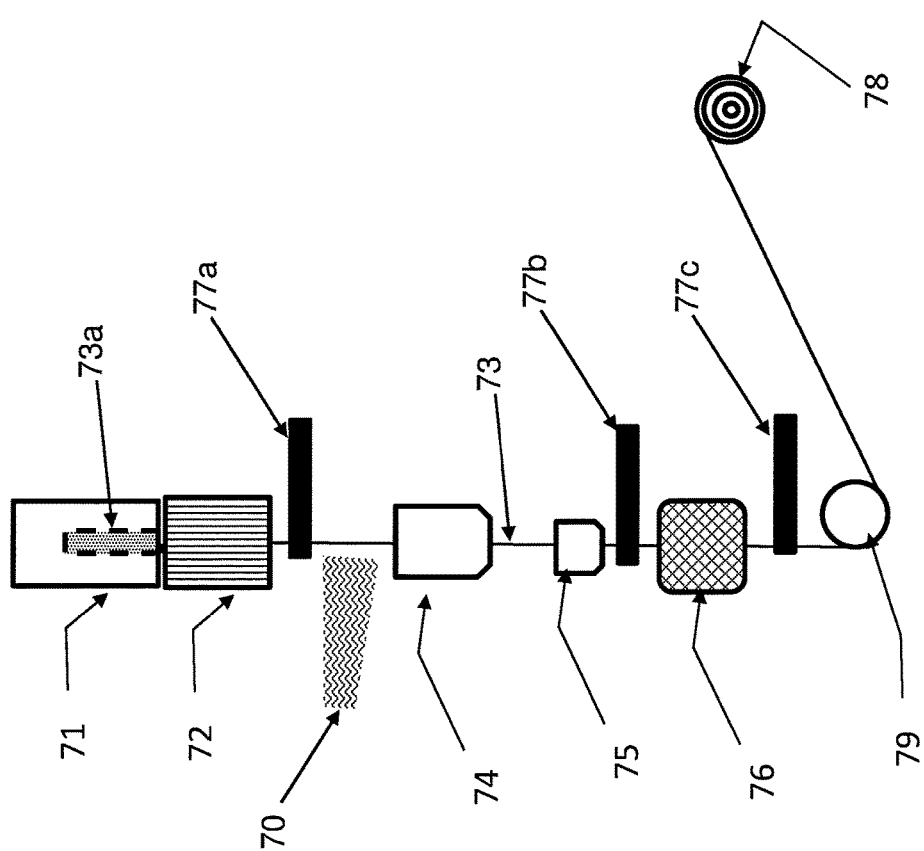
FIG. 7 is a schematic drawing of a drawing tower where the main coating and an additional coating is applied in an in-line process and where the drawing tower comprises a coating station application of a metal coating.

The drawing tower shown in FIG. 7 is in the process of drawing a PCF 73 from a preform 73a. The preform is enclosed in a pressure control chamber 71 comprising one or more pressure chambers for controlling the pressure of gas inclusions in the PCF. A bottom part extends into a furnace 72, where the bottom part of the preform is heated and the fiber 73 is drawn to a desired thickness. The velocity of the fiber is controlled by the drawing wheel 79 pulling the PCF 73 through the various stations of the drawing towers. From the furnace 72 the fiber is passed through a monitoring station 77a where the diameter of the fiber is monitored in-line.

From the monitoring station 77a the PCF 73 is passed to the coating station 74 for application of a main metal coating.

The coating station 74 comprises a liquid metal melt at a relatively high temperature, but to ensure an even coating layer the fiber should have a temperature below the temperature of the melt. A blower or similar cooling means may be applied prior to the coating station 74 to blow cool air 70 to cool the PCF 73.

Suitable melt temperatures are listed in table 1

TABLE 1

| Metal | Melt temperatures (° C.) |
| --- | --- |
| Aluminum | 660 |
| Aluminum Alloy | 400-671 |
| Gold, 24K Pure | 1063 |
| Cobber | 1063 |
| Alloys of Cobber and/or Gold | 550-1063 |

The PCF 73 is passed through the metal melt at a desired velocity equal to the fiber drawing velocity. The thickness of the metal coating may be adjusted e.g. by adjusting the amount of melt in the melt chamber of the coating station 74 or the fiber velocity.

From the coating station 74 the metal coated PCF is passed further to an additional coating station 75 for application of an additional coating, which in the shown embodiment is a polymer coating station 75. From the coating station 75 the coated PCF is passed to a concentricity monitor 77b and further to a curing station 76 where the polymer coating is cured by light.

From the curing station 76 the coated PCF is passed further to an additional monitor 77c for monitoring the fiber diameter. From the drawing wheel 79 the coated PCF is passed to spooling onto a spool 78.

The invention claimed is:
1. A microstructured fiber (MSF) comprising:
 a solid core extending along a longitudinal axis of the MSF,
 a cladding region surrounding the core, wherein at least the cladding region comprises a plurality of inclusions extending along the longitudinal axis of the MSF in at least a length section, wherein the MSF, in at least a selected length section of said length section, comprises hydrogen and/or deuterium, wherein the MSF, in at least said selected length section, further comprises a coating surrounding the cladding region, wherein the coating is hermetic for said hydrogen and/or deuterium at a temperature below $T_h$, wherein $T_h$ is 50° C.$<T_h<$250° C., wherein the cladding region in at least said selected length section comprises an inner cladding region comprising the plurality of inclusions and an outer cladding region surrounding the inner cladding region and wherein the radial distance between an outermost inclusion of the inner cladding region and the coating is at least about 10 μm.

2. The MSF of claim 1, wherein the plurality of inclusions is arranged in a pattern comprising at least two rings of inclusions surrounding the core.

3. The MSF of claim 1, wherein the plurality of inclusions comprise gas inclusions.

4. The MSF of claim 1, wherein said selected length section is the whole length of the MSF with an exception of any closed ends of the MSF, wherein a closed ends can have a length along the longitudinal axis of the MSF of up to about 3 mm.

5. The MSF of claim 1, further comprising inclusions located in the outer cladding region ("outer inclusion"), wherein said inclusions located in the inner cladding region ("inner inclusions") are larger than the outer inclusions.

6. The MSF of claim 1, wherein material between the inner cladding region and the main coating forms a reservoir for hydrogen and/or deuterium.

7. The MSF of claim 1, wherein the core in at least said selected length section has a core diameter of about 10 μm or less.

8. The MSF of claim 1, wherein an innermost inclusion in at least said selected length section has a center-to-center distance to the core of less than about 50 μm.

9. The MSF of claim 1, wherein the MSF has anomalous dispersion for at least one wavelength between 1000 nm and 1100 nm.

10. The MSF of claim 1, wherein the core of the MSF is spatially single mode at 1064 nm.

11. The MSF of claim 1, wherein the core of the MSF is single mode at 1030 nm.

12. The MSF of claim 1, wherein at least the core of the MSF is essentially free of Germanium.

13. The MSF of claim 1, wherein at least the core of the MSF is essentially free of active material.

14. The MSF of claim 1, wherein the coating comprises nitride, carbon, aluminum, gold, copper, nickel, metallic glass or a combination or an alloy comprising one or more of the before mentioned.

15. The MSF of claim 1, wherein the main coating has a thickness of about 5 nm to about 25 μm.

16. The MSF of claim 1, wherein the coating is diffusion open for hydrogen and/or deuterium at a temperature above $T_o$, where $T_o$ is larger than $T_h$.

17. The MSF of claim 1, wherein the MSF comprises at least one additional coating for mechanical protection outside said coating.

18. The MSF of claim 1, wherein the MSF comprises at least one tapered length section wherein said core in a first end of the tapered length section has a core diameter D1 and said core in a second end of the tapered length section has a core diameter D2, wherein D1 is larger than D2.

19. The MSF of claim 18, wherein the first end of the tapered length section is at a launching end of the fiber or up to 5 cm along the length from the launching end of the fiber.

20. The MSF of claim 1, wherein the MSF comprises at least two spliced fiber length sections, wherein at least one spliced fiber length section is or comprises said selected length section.

21. The MSF of claim 1, wherein the MSF comprises:
a first length section with a first length L1, wherein the inclusions of said MSF at least at a first cross-section through the first length section perpendicularly to the longitudinal axis have
a first pitch Λ1,
a first inclusion diameter d1, and
a first relative size d1/Λ1 of inclusions,
a second length section with a second length L2, wherein the inclusions of said MSF at least at a second cross-section through the second length section perpendicularly to the longitudinal axis have
a second pitch Λ2,
a second inclusion diameter d2, and
a second relative size d2/Λ2 of inclusions, and
wherein at least one of said first length L1 and said second length L2 comprises said selected length section.

22. The MSF of claim 1, wherein the MSF comprises a mode-adaptor extending along the length of the MSF in at least a mode-field adapting length section extending from a launching end of the MSF up to 5 cm from the launching end of the MSF, wherein said mode-field adapting length section has a length of at least about 5 cm.

23. A method of producing the MSF as claimed in claim 1, wherein the method comprises
producing a preform comprising a preform structure for the core and the cladding region of the MSF,
drawing the preform to obtain the core and cladding region of the MSF,
subjecting at least the selected length section of the MSF to hydrogen and/or deuterium loading, and
applying the coating to at least said selected length section of the MSF.

24. The method of claim 23, wherein the method comprises subjecting the MSF to hydrogen and/or deuterium loading prior to application of the coating.

25. The method of claim 24, wherein the hydrogen and/or deuterium loading comprises placing the MSF in a chamber containing hydrogen and/or deuterium at a pressure of at least about P1 and temperature of at least about T1 for a duration of at least t1.

26. The method of claim 23, wherein the method comprises subjecting the MSF to hydrogen and/or deuterium loading after application of the coating.

27. The method of claim 26, wherein the method comprises
subjecting the MSF to hydrogen and/or deuterium at a temperature of at least about $T_o$, and
cooling the MSF to $T_h$ or less.

28. The method of claim 26, wherein the hydrogen and/or deuterium loading comprises placing the MSF in a chamber containing hydrogen and/or deuterium at a pressure of at least about P2 and temperature of at least about T2$>T_o$ for a duration of at least t2.

29. The method of claim 23, wherein the inclusions comprise gas and the method comprises closing said inclusions on either side of said selected length section.

30. The method of claim 29, wherein the inclusions are closed prior to subjecting the MSF to hydrogen and/or deuterium loading.

31. The method of claim 23, wherein the method comprises application of at least one additional coating outside said coating.

32. The method of claim 23, wherein the coating is a carbon coating, said method comprises applying said carbon coating by a chemical vapor deposition process comprising pulling the fiber through a reactor chamber of a reactor and subjecting the fiber in the reactor chamber to a reactor gas at a temperature of at least about 700° C., wherein the reactor gas comprises a carbonaceous composition.

33. The method of claim 32, wherein the method comprises applying said carbon coating immediately after drawing the fiber in a drawing tower.

34. The method of claim 33, wherein said reactor is an integrated part of said drawing tower.

35. The method of claim 32, wherein the method comprises applying an additional coating onto said carbon coating.

36. The method of claim 23, wherein the coating is a metal coating, said method comprises applying said metal coating by pulling the fiber through a liquid metal melt, where the temperature of the fiber as it enters the melt is lower than the temperature of the metal melt.

37. The method of claim 36, wherein the metal coating is applied to the fiber in the drawing tower after the fiber is drawn and at least partially cooled down.

38. A supercontinuum light source comprising the MSF of claim 1, and a pump source arranged to feed pump pulses to a launching end of the MSF.

39. The supercontinuum light source of claim 38, wherein the MSF is arranged to generate a supercontinuum light with a broadened band width relative to the bandwidth of said pump pulses.

40. The supercontinuum light source of claim 38, wherein the pump pulses generated by said pulse source have a peak power at the launching end of the MSF of at least about 5 kW.

41. The supercontinuum light source of claim 38, wherein the pump pulses generated by said pulse source have a pulse duration of up to about 200 ps.

42. The supercontinuum light source of claim 38, wherein the pump pulses generated by said pulse source have a repetition rate of at least about 10 kHz.

43. The supercontinuum light source of claim 38, wherein the pump pulses generated by said pulse source have a wavelength of from about 900 nm to about 1100 nm.

44. The supercontinuum light source of claim 38, wherein the supercontinuum light source has an average output power of at least about 1 W.

45. The supercontinuum light source of claim 38, wherein the supercontinuum light source has an output comprising wavelengths less than about 600 nm.

46. The supercontinuum light source of claim 38, wherein the supercontinuum light source has an output comprising wavelengths of more than about 1400 nm.

47. The supercontinuum light source of claim 38, wherein the supercontinuum light source further comprises a spectral filtering unit, arranged to filter the output of said supercontinuum source to a filtered supercontinuum output having a central wavelength of $\lambda 1$ and an output bandwidth BW1, wherein at least one of the central wavelength of $\lambda 1$ and the output bandwidth BW1 is tunable, said output bandwidth BW1 is, at least in one tuning, less than about 5 nm.

48. An illumination source comprising the supercontinuum light source of claim 38.

49. The illumination source of claim 48, wherein the illumination source is adapted for fluorescence Imaging; Fluorescence Lifetime Imaging (FLIM); Total Internal Reflection Fluorescence (TIRF) Microscopy; fluorescence resonance energy transfer (FRET); broadband Spectroscopy; nanophotonics; flow cytometry; industrial inspection; ringdown spectroscopy; analytical spectroscopy; single Molecule Imaging and/or combinations thereof.

50. The MSF of claim 1, wherein the MSF, in at least the selected length section of said length section, comprises hydrogen.

51. The MSF of claim 1, wherein the MSF, in at least the selected length section of said length section, comprises deuterium.

* * * * *